(12) United States Patent
Parolini et al.

(10) Patent No.: US 8,539,059 B2
(45) Date of Patent: Sep. 17, 2013

(54) MANAGING COOLING DEVICES AND COMPUTING NODES IN AN INFRASTRUCTURE

(75) Inventors: Luca Parolini, Pittsburgh, PA (US); Niraj Tolia, Mountain View, CA (US); Bruno Sinopoli, Pittsburgh, PA (US); Bruce Krogh, Pittsburgh, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 777 days.

(21) Appl. No.: 12/792,400

(22) Filed: Jun. 2, 2010

(65) Prior Publication Data

US 2011/0302286 A1    Dec. 8, 2011

(51) Int. Cl.
  *G06F 15/173*    (2006.01)
(52) U.S. Cl.
  USPC .......................................... 709/223
(58) Field of Classification Search
  None
  See application file for complete search history.

(56) References Cited

U.S. PATENT DOCUMENTS

| | | | | |
|---|---|---|---|---|
| 7,206,644 | B2 * | 4/2007 | Iino et al. | 700/36 |
| 7,272,732 | B2 * | 9/2007 | Farkas et al. | 713/320 |
| 7,441,135 | B1 * | 10/2008 | Chan et al. | 713/320 |
| 2005/0055590 | A1 * | 3/2005 | Farkas et al. | 713/320 |
| 2010/0076607 | A1 * | 3/2010 | Ahmed et al. | 700/276 |

OTHER PUBLICATIONS

Cullen Bash et al., Cool Job Allocation: Measuring the Power Savings of Placing Jobs at Cooling-Efficient Locations in the Data Center, Aug. 23, 2007, Hewlett-Packard Development Company, L.P.

Cullen E. Bash et al., Dynamic Thermal Management of Air Cooled Data Centers, Jan. 13, 2006, Hewlett-Packard Development Company, L.P.

Jeffery S. Chase et al., Managing Energy and Server Resources in Hosting Centers, Department of Computer Science, Duke University, downloaded Jun. 2, 2010.

Yiyu Chen et al., Managing Server Energy and Operational Costs in Hosting Centers, Jun. 6-10, 2005, In SIGMETRICS.

E.N. Elnozahy et al., Energy-efficient Server Clusters, Feb. 2002, In PACS.

Tony Evans et al., Humidification Strategies for Data Centers and Network Rooms, 2004, Technical report White Paper 58, APC.

Anshul Gandhi et al., Optimal Power Allocation in Server Farms, 2009, School of Computer Science, Carnegie Mellon University.

Laura Grit et al., Virtual Machine Hosting for Networked Clusters: Building the Foundations for "Autonomic" Orchestration, Department of Computer Science, Duke University, downloaded Jun. 2, 2010.

James Hamilton, Cost of Power in Large-scale Data Centers, downloaded Jun. 2, 2010.

(Continued)

Primary Examiner — Peling Shaw (57) ABSTRACT

A system for managing computing nodes and cooling devices cooling the computing nodes in an infrastructure includes one or more managers. The one or more managers receive a service request for a workload to be run on one or more of the computing nodes. Candidate workload placements for placing the workload on the one or more computing nodes are determined. A first cost associated with each candidate workload placements using a computational network model. A second cost associated with the cooling devices for each candidate workload placement is determined using a thermal network model. A cost function is minimized. The cost function determines an economic cost of operating the infrastructure while running the requested workload and is based upon the first cost, the second cost. A candidate workload placement is selected from the candidate workload placements based on the minimized cost function.

20 Claims, 4 Drawing Sheets

(56) References Cited

OTHER PUBLICATIONS

Taliver Heath et al., Mercury and Freon: Temperature Emulation and Management for Server Systems, Oct. 2006, California, In ASPLOS.

Taliver Heath et al., Energy Conservation in Heterogeneous Server Clusters, downloaded Jun. 2, 2010.

Justin Moore et al., Making Scheduling "Cool": Temperature-aware Workload Placement in Data Centers, downloaded Jun. 2, 2010.

Kevin Dunlap et al., The Advantages of Row and Rack-oriented Cooling Architectures for Data Centers, 2006, American Power Conversion.

Luca Parolini et al., A Unified Thermal-Computational Approach to Data Center Energy Management, Dept. of Electrical and Computer Engineering, Carnegie Mellon University, downloaded Jun. 2, 2010.

Charles Lefurgy et al., Power Capping: a Prelude to Power Shifting, downloaded Jun. 2, 2010.

Chenyang Lu et al., Performance Specifications and Metrics for Adaptive Real-Time Systems, University of Virginia, downloaded Jun. 2, 2010.

Ying Lu et al., Feedback Control with Queueing-Theoretic Prediction for Relative Delay Guarantees in Web Servers, downloaded Jun. 2, 2010.

Ying Lu et al., An Adaptive Control Framework for QoS Guarantees and its Application to Differentiated Caching Services, 2002, University of Virginia.

Jianfeng Mao et al., Optimal Control of Multi-Stage Discrete Event Systems with Real-Time Constraints, Jan. 2009, IEEE Transactions on Automatic Control, vol. 54, No. 1.

Trevor Pering et al., The Simulation and Evaluation of Dynamic Voltage Scaling Algorithms, University of California Berkeley Electronics Research Laboratory, downloaded Jun. 2, 2010.

Eduardo Pinherio et al., Dynamic Cluster Reconfiguration for Power and Performance, Department of Computer Science, Rutgers University, downloaded Jun. 2, 2010.

Ramya Raghavendra et al., No "Power" Struggles: Coordinated Multi-level Power Management for the Data Center, Mar. 2008, ASPLOS'08, Seattle, Washington, USA.

Karthick Rajamani et al., On Evaluating Request-Distribution Schemes for Saving Energy in Server Clusters, downloaded Jun. 2, 2010.

Peter Rumsey, Overview of Liquid Cooling Systems, Slides, downloaded Jun. 2, 2010.

Thomas L. Saaty, Elements of Queuing Theory with Applications, 1961, Chapter 4.

Qinghui Tang et al., Sensor-Based Fast Thermal Evaluation Model for Energy Efficient High-Performance Datacenters, downloaded Jun. 2, 2010.

Niraj Tolia et al., Unified Thermal and Power Management in Server Enclosures, Jul. 2009, San Francisco, InterPACK '09.

U.S. Environmental Protection Agency (EPA), Aug. 2, 2007, Report to Congress on Server and Data Center Energy Efficiency, Public Law 109-431.

Chandrakant D. Patel et al., Smart Cooling of Data Centers, 2003, In IPACK.

* cited by examiner

MANAGING COOLING DEVICES AND COMPUTING NODES IN AN INFRASTRUCTURE

BACKGROUND

Data centers are cyber-physical systems. Energy management depends upon management of both computational (cyber) resources and cooling (physical) resources. Although these two types of resources are connected through the generation of thermal energy, they are normally controlled independently. For example, workloads are distributed among servers to meet performance objectives under the assumption that the cooling system will remove thermal energy as required. The cooling system responds to the thermal load generated by the servers through thermostatic control.

Data center power consumption has drastically increased in the past few years. According to a report of the Environmental Protection Agency (EPA) published in 2007, data center peak load power consumption was 7GW in 2006 and, at the current rate, it is expected to increase up to 12GW by 2011 leading to a cost of $7.4 billion per year. Similarly, rack power consumption has increased up to 30 KW.

At current power usage levels, powering and cooling servers, racks, and the entire data center efficiently has become a challenging problem. Monthly management cost for a 15 MW facility can be as high as $5.6M. Income is determined by service level agreements (SLAs), which set the price paid by users based on the quality of service (QoS) they receive. A data center's operating margin depends on the provided quality of service. Higher QoS levels typically lead to higher rates that can be charged to customers.

Several factors make it impractical to design and implement a single centralized controller to manage all resources in a data center, including both the computational (cyber) resources and the cooling (physical) resources. For example, there may be hundreds of variables to be measured and controlled to manage the resources. Also, the dynamics of controlled processes span over multiple time scales. For example, electricity costs can fluctuate on a time scale of hours, temperatures evolve in the order of minutes, and server power state control can be as frequent as milliseconds. Actuators differ not only in time scales, but also in the spatial areas they influence. For example, computer room air conditioner (CRAC) reference temperatures can affect the inlet air of multiple servers, while central processing unit CPU power states affect only single servers. The inability to manage the computational (cyber) resources and the cooling (physical) resources in the data center centrally lends itself to inefficient use of the resources and as a result increased costs for power and cooling.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein is a system for managing a plurality of computing nodes and a plurality of cooling devices in an infrastructure, according to an embodiment. Also, disclosed herein is a method for managing a plurality of computing nodes and a plurality of cooling devices in an infrastructure, according to an embodiment.

Through implementation of the method and management system disclosed herein, the system may implement a control strategy for data centers that aims to optimize the trade-off between maximizing the payoff from the provided quality of computational services and minimizing energy costs for computation and cooling. Simulation results demonstrate the effectiveness of the coordinated control strategy relative to traditional approaches in which the cyber and physical resources are controlled independently. Although innovations continue to be developed in both cooling and computational systems to make data centers more energy efficient, the decoupled control strategies used today do not realize the efficiencies that could be obtained through a coupled cyber-physical system (CPS) perspective.

Figure 1:
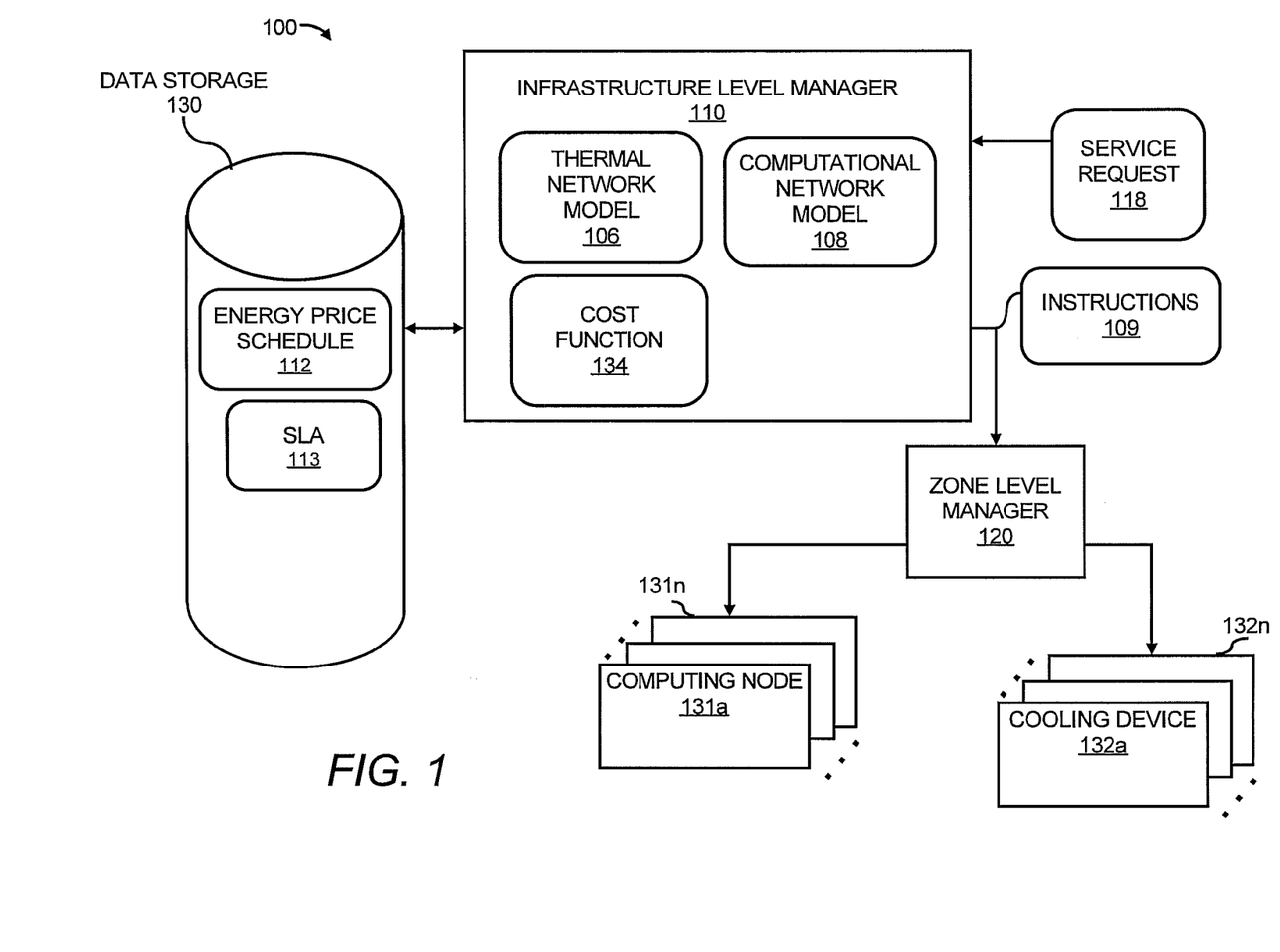
FIG. 1 shows a block diagram of a system for managing a plurality of computing nodes and a plurality of cooling devices in an infrastructure, according to an embodiment of the invention.

With reference first to FIG. 1, there is shown a block diagram of a system 100 for managing a plurality of computing nodes 131$a$-$n$ and a plurality of cooling devices 132$a$-$n$ in an infrastructure, according to an embodiment. The infrastructure may comprise, for instance, a rack, a data center or other structure or area housing computing nodes and cooling devices. The system 100 includes one or more managers configured to determine placement for a workload on the computing nodes 131$a$-$n$ that minimizes a cost function 134. The one or more managers, as illustrated in FIG. 1, comprise an infrastructure level manager 110 and a zone-level manager 120. The cost function 134 determines an economic cost of operating the infrastructure while running the requested workload on one or more of the computing nodes 131$a$-$n$. The cost function 134 may be based on a service level agreement (SLA) 113 including a quality of service (QoS), and an energy price schedule 112, for instance a price of electricity. The SLA 113 may comprise one or more SLAs or applicable terms in the one or more SLAs. Workload may comprise any applications or computations to be executed on a computing node. The system 100 may also include a data store 130. It should be understood that the system 100 may include additional components and that one or more of the components described herein may be removed and/or modified without departing from a scope of the system 100.

The system 100 may be configured to receive a service request 118 at the infrastructure level manager 110 for a workload to be run on the plurality of computing nodes 131$a$-$n$. For instance, the workload may comprise atomic-computations, which are computations that cannot be broken down into smaller units for the computing nodes 131a-n. The atomic computations may be from aggregated service requests 118. The system 100 determines placement for the workload among the computing nodes 131a-n and controls the cooling devices 132a-n based upon the cost function 134. The system 100 may thereby determine an optimal trade-off between offered QoS and data center energy cost. More particularly, the infrastructure level manager 110 and zone-level manager 120 are configured to manage the computing nodes 131a-n and the cooling devices 132a-n while minimizing the cost function 134 by using a thermal network model 106 and a computational network model 108.

The infrastructure level manager 110 may determine u∈U (t, t+T) to minimize the cost function. U(t, t+T) is a set of admissible functions over an interval [t, t+T] for controllable variables in the computational network model 108 and the thermal network model 106. The admissible functions are functions that satisfy predetermined conditions in the system under consideration. The cost function may be determined as $$J(u, \xi, t_0, T) = \int_{t0}^{t0+T} c_p(t) \|p(t)\|_1 + \sum_{i=1}^{N} \sum_{j=1}^{J} c_q^j(q_i(t)) dt, \quad \text{Equation (1)}$$

in which $c_p(t)$ is an energy price at time t, p(t) is power consumed by the computing nodes and the cooling devices, $c_q$ is a cost vector for quality of service (QoS) and $c_q^j$ is its $j^{th}$ component, and $q_i(t)$ is a QoS at time t.

The system 100 may minimize the cost function 134 for the infrastructure while running the workload on the computing nodes 131a-n by managing the execution of the workload at different hierarchical levels of the infrastructure using the infrastructure level manager 110 and zone-level manager 120. The hierarchical levels may comprise, for instance, an arrangement of the infrastructure in order of areas managed by the infrastructure level manager 110 and the zone-level manager 120. Each of the managers 110 and 120 is configured to manage the running of the workload on the computing nodes 131a-n at a predetermined hierarchical level while minimizing the cost function 134. For instance, the system 100 may manage the running of the workload on the computing nodes 131a-n at an infrastructure level using the infrastructure level manager 110, at a zone-level using the zone-level manager 120, and at an intra-zone-level using an intra-zone-level manager (not shown). The infrastructure level is the highest level and comprises an overall management of the infrastructure. A zone is an area within the infrastructure that is smaller than the entire infrastructure. For example, a zone may include a set of racks and associated cooling devices. Intra-zone refers to an area withing a zone. For example, a rack may be intra-zone.

At each level of the hierarchy, the control decisions and manipulated variables used by the managers are selected based on dominant dynamics of the time scale being addressed. Slower thermal dynamics are most relevant at higher levels while fast dynamics of the computational systems are more dominant at lower levels. Variables may be chosen at each hierarchical level accordingly. For instance, the infrastructure level manager 110 may perform bulk management of workload and thermal management at the infrastructure level, using workload projections at predetermined intervals to schedule cooling and to select candidate workload placements. The zone-level manager 120 performs management of workload and thermal management at the zone-level, including allocation of workload and cooling in sub-areas of selected candidate workload placements, for instance selected zones of the infrastructure. The intra-zone-level manager performs optimization of workload scheduling for assigned jobs at a processor level and may be executed as described in C. Lefurgy, X. Wang, and M. Ware, Server-Level Power Control, the 4th IEEE International Conference on Autonomic Computing (International Conference on Autonomic Computing June 2007).

Figure 2:
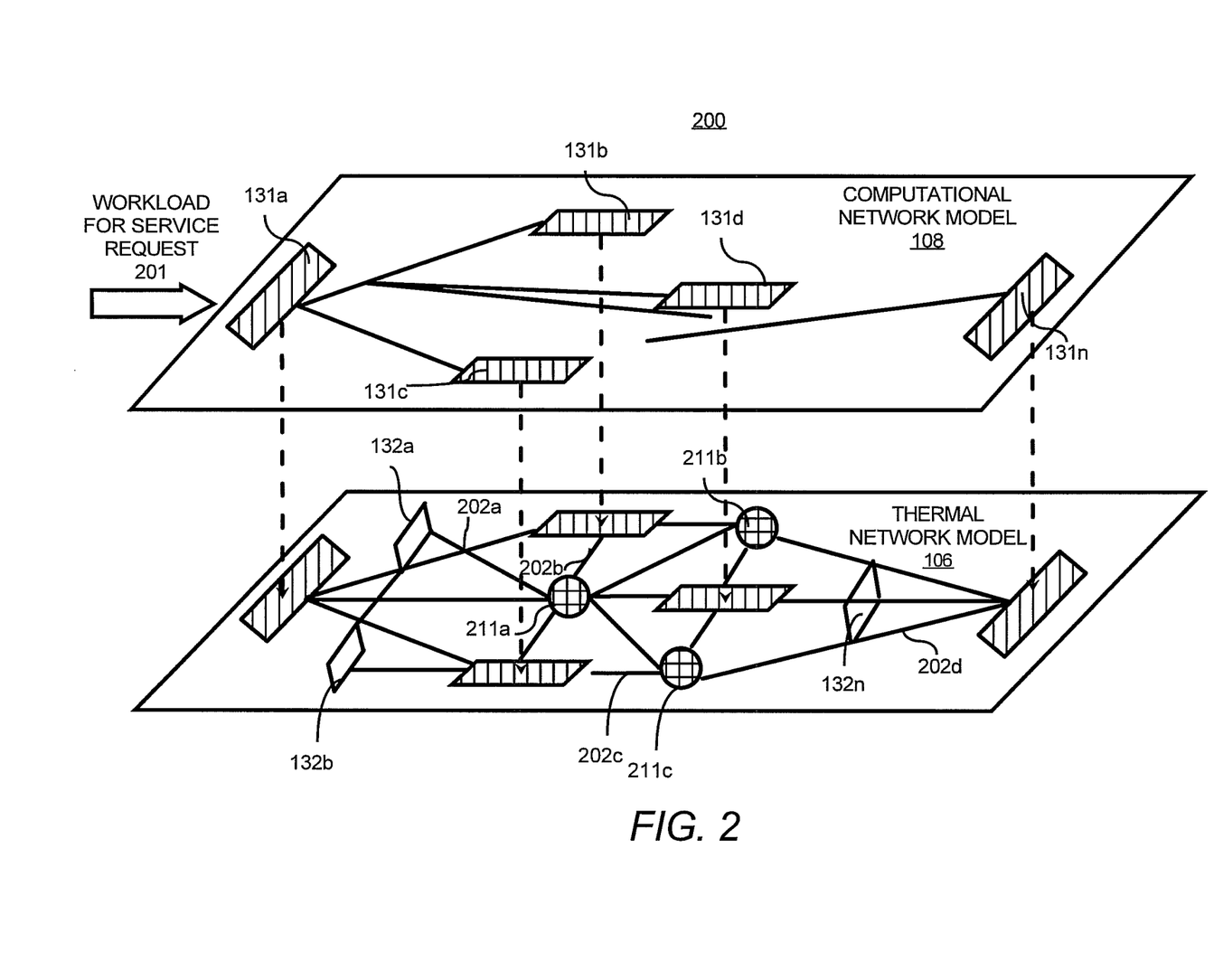
FIG. 2 shows a diagram of a coupled network model, according to an embodiment of the invention.

Turning now to FIG. 2, the infrastructure level manager 110 and zone-level manager 120 in the system 100 may be configured to manage the infrastructure using a coupled network model 200, according to an embodiment. In the coupled network model 200, a computational network model 108 is connected to a thermal network model 106 through the computing nodes 131a-n that produce a power output while running the workload. The power output in turn becomes thermal energy. The computational network model 108 includes information for the computing nodes 131a-n. The thermal network model 106 includes information for different types of network nodes including the computing nodes 131a-n, the cooling devices 132a-n and environmental nodes 221a-n. Environmental nodes 221a-n are nodes representing devices in the infrastructure that cannot be used to perform computations or to control cooling of the infrastructure, but that nonetheless take part in the heat exchange. It should be understood that the coupled network model 200 may include additional components and that one or more of the components described herein may be removed and/or modified without departing from a scope of the coupled network model 200.

The coupled network model 200 receives a workload for the service request 201 at a scheduler, for instance computing node 131a. Thereafter, the computations may be routed to different computing nodes 131b-n based on different inputs to the computational network model 108.

As shown in FIG. 2, the coupled network model 200 describes the relationships between the nodes in the computational network model 108 and the thermal network model 106. For instance, in the thermal network model 106, the environmental node 211a is connected to both the cooling device 132a and the computing node 131b-c by lines 202a and 202b. The relationship between the computational network model 108 and the thermal network model 106 is illustrated with dashed lines from each of the computing nodes 131a-n in the computational network 108 to their corresponding representations in the thermal network model 106. More particularly, the computations performed by the computing nodes 131a-n produce a thermal output. The thermal output of the computing nodes 131a-n in turn affects actuation of the cooling devices 132a-n and power consumption in the thermal network model 106. In the coupled network model 200, the thermal network model 106 may thereby use information from the computational model 108 in determining power consumption.

The computational network model 108 describes the computational aspects of the infrastructure, including the relationships between workload distribution and quality of service, while the thermal network model 106 describes the physical aspects of the infrastructure, including the relationships between power consumption, heat production, and heat exchange. The models described herein may be determined by analyzing historical values to determine these relationships. As distinct workloads use computational resources of the computing nodes 131a-n differently, heterogeneous workloads can lead to different amounts of power consumption on each of the computing nodes 131a-n. At the same time, some of the computing nodes 131a-n may be easier to cool than others (e.g., due to their relative positions in the rack). Thus workloads not only have different power requirements for the computing nodes 131a-n, their distribution in the infrastructure can also significantly impact the power required to remove the generated heat. These relationships are represented in FIG. 2 by the lines connecting different nodes and are included in the model's mathematical formulation.

More particularly, the computational network model 108 may be used to minimize the cost function 134 by determining power consumption for each computing node i based on a requested workload. For instance, $$p_i(t)=f_{p,S}(i,\lambda_i(t),I_i(t),\rho_i(t)),\quad\text{Equation (2)}$$

in which $p_i(t)$ is power consumption of a computation at a time t, $f_{p,S}$ is a function based upon particular characteristics of the computing node (e.g., hardware), and $I_i(t)$ is a vector whose entries represent the number of jobs (divided per job classes) present at the computing node already. For example, the $j^{th}$ element of $I_i(t)$ represents the number of class j jobs at the computational node at time t. The variable $\rho_i(t)$ is a vector whose entries represent the ratio of computational resources assigned to a particular job-class at time t, and the variable $\lambda_i(t)$ is the arrival rate of jobs at the computing node. Equation (2) may be used to determine power consumption for different candidate workload placements for placing the workload on the computing nodes 131a-n. A candidate workload placement is an available resource or a set of available resources that may run a workload requested in the service request 118. There may be multiple candidate workload placements and one is selected that minimizes the cost function.

Additionally, the computational network model 108 may be used to minimize the cost function 134 by determining QoS for each computing node i $$q_i(t)=f_q(i,\lambda_i(t),I_i(t),p_i(t)),\quad\text{Equation (3)}$$

in which $q_i(t)$ is a vector of the QoS (which may include multiple required QoS metrics or requested QoS metrics for running the workload) at time t at computing node i, $I_i(t)$ is a number of jobs already present at the computing node, $p_i(t)$ is power consumption at a time t, and $\lambda_i(t)$ is an arrival rate of jobs in class j at time t.

Similarly, the thermal network model 106 may be used to minimize the cost function by determining power consumption for each cooling device i based on a requested workload. For instance, $$p_i(t)=f_{p,C}(i,c_i(t),T_{ini}(t),T_{outi}(t)),\quad\text{Equation (4)}$$

in which $p_i(t)$ is power consumption at a time t and $f_{p,C}$ is a function based upon the coefficient of performance (COP) of the cooling device, and additional components that consume energy in the cooling device, $c_i(t)$ is a binary variable representing an on/off state of each cooling device 132, and $T_{ini}(t)$ and $T_{outi}(t)$ are input temperatures and output temperatures of the cooling device 132 at time t, may be used to determine power consumption of the cooling devices 132a-n for different candidate workload placements on the computing nodes 131a-n.

The coupled computational network model 108 and thermal network model 106 may be used when the optimization of a single container, row, rack, or blade enclosure is the goal of the manager. In each case the modeled network nodes correspond to the detailed behaviors of the components internal to the units of equipment. For instance, the modeled network node may correspond to the behavior of each of a plurality of heterogeneous servers contained within a rack. Alternatively, when the goal of the manager is the optimization of the whole infrastructure, each unit of equipment can be modeled as a single node representing the aggregate behavior of its internal components. In that instance, the modeled network node represents an aggregate behavior of the plurality of heterogeneous servers contained in the rack.

Aggregating multiple heterogeneous devices into a single node may be a coarse approximation to the actual behavior of a complex unit of equipment. The aggregation of multiple nodes at one level into single nodes at the level above in the hierarchy may be determined by engineering insight and data-driven analysis. Minimizing the differences between the aggregate evolutions of devices modeled as single nodes at one level and the evolution of sets of lower-level nodes may be the duty of managers at lower levels in the hierarchy. The disaggregation problem is to define a function to associate input, output, and state variables of an aggregate node at one level to input, output, and state variables of the associated set of nodes in the next lower level in the hierarchy.

The choice of the best disaggregation function is delegated to the managers in lower-levels of the hierarchy. According to an embodiment, the system 100 may be configured to perform a hierarchical control strategy in which desired aggregated state variables, i.e., server power states, output temperatures, and buffer length, are not transmitted to the lower-level managers, such as zone managers in the zones. The infrastructure level manager 110 communicates only a target aggregate power cost and a target aggregate QoS cost to the zone-level manager 120. The zone-level manager 120 may be configured to find a best disaggregation function that minimizes both the difference between the total cost of power consumption and the target aggregated cost of power consumption and the difference between the total QoS cost and the target aggregated QoS cost.

Figure 3:
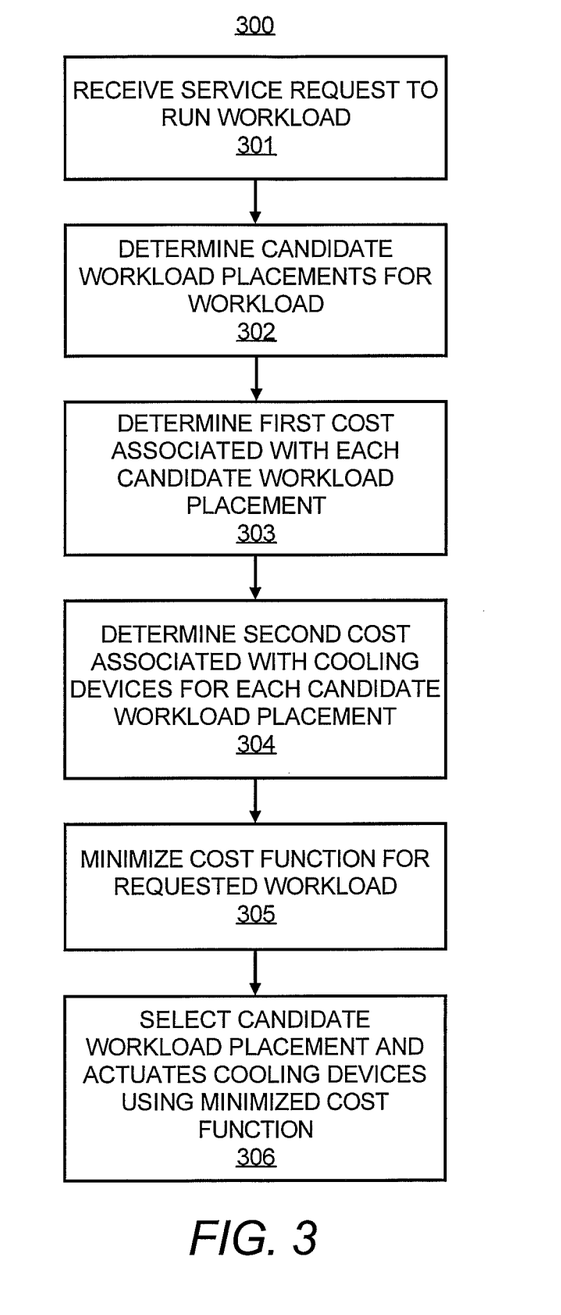
FIG. 3 shows a flow diagram of a method for managing a plurality of computing nodes and a plurality of cooling devices in an infrastructure, according to an embodiment of the invention.

Turning now to FIG. 3, there is shown a flow diagram of a method 300 for managing computing nodes and cooling devices in an infrastructure, according to an example. It should be understood that the method 300 may include additional steps and that one or more of the steps described herein may be removed and/or modified without departing from a scope of the method 300.

The description of the method 300 is made with reference to the system 100 depicted in FIGS. 1-2 and thus makes particular reference to the elements contained in the system 100. It should, however, be understood that the method 300 may be implemented in a system that differs from the system 100 without departing from a scope of the method 300. The method 300, unless otherwise noted, may be applied at either the infrastructure level manager 110 or the zone-level manager 120 in the hierarchal configuration of the system 100.

With particular reference to FIG. 3, at step 301, the manager receives a service request for workload to be run on one or more of the computing nodes in the infrastructure. For instance, the infrastructure level manager 110 may receive a request for bulk processing of a workload. Similarly, the zone-level manager 120 may receive a request for processing of the workload from the infrastructure level manager as detailed at step 306 hereinbelow.

At step 302, the manager, for instance the zone-level manager 120 at the zone-level, determines candidate workload placements for placing the workload on the one or more computing nodes. The infrastructure level manager 110 may also determine candidate workload placements for placing the workload on the one or more computing nodes at the infrastructure level. Candidate workload placements may be determined by identifying resources, such as computing and cooling nodes, that are available to run the workload and can be efficiently cooled.

According to an embodiment, the zone-level manager 120 and the infrastructure level manager 110 manage the system 100 in a hierarchal control strategy. The infrastructure level manager 110 performs bulk management of workload and thermal management at the infrastructure level and the zone-level manager 120 performing management of workload and thermal management at the zone-level. The infrastructure level manager 110 determines candidate workload placements in aggregate while the zone-level manager 120 may determine workload placements for specific computing nodes 131a-n based on instructions received from the infrastructure-level manager 110.

At step 303, the manager determines a first cost associated with each candidate workload placement using a computational network model 108. For instance, the cost may to model power consumption of the one or more computing nodes 131a-n using Eqn. (2). Additionally, the computational network model 108 may be used to determine cost of QoS under the SLA 113 using Eqn (3).

At step 304, the manager determines a second cost associated with the cooling devices 132a-n for each candidate workload placement using a thermal network model 106. The thermal network model 106 may be used to model power consumption of the cooling devices 132a-n. For instance, Eqn. (4) may be applied to determine the power consumption of the cooling devices 132a-n for a candidate workload placement.

At step 305, the manager minimizes the cost function 134 while running the requested workload. The cost function 134, for instance shown in Eqn. (1), may determine an economic cost of operating the infrastructure based upon the first cost, the second cost and an energy price. The cost function may also include power consumption of environmental nodes in the infrastructure.

According to an embodiment, at the infrastructure level, the infrastructure level manager 110 selects a bulk workload placement that minimizes the cost function. The infrastructure level manager 110 may determine controllable variables that minimize an economic cost of operating the infrastructure while running the requested workload by applying Eqn. 1.

At step 306, the manager selects a candidate workload placement and actuates cooling devices 132a-n using the minimized cost function 134. The candidate workload placement is selected from the candidate workload placements based on the minimized cost function 134. The cooling devices 132a-n are also actuated accordingly based on the workload on the computing nodes 131a-n. For example, the candidate workload placement is selected that has the least economic cost and is best able to satisfy QoS requirements under the SLA 113. This candidate workload placement is selected by minimizing the cost function 134.

According to an embodiment, the infrastructure level manager 110 may determine a target aggregated power cost and a target aggregated QoS cost for at least one or more zone level managers 120 based on the minimized cost function. The infrastructure level manager 110 provides the target aggregated QoS and the target aggregated power cost in an instruction 109 to the zone level manager 110 and thereby directs aggregate placement of the workload within the infrastructure.

The zone level manager 120 may in turn select placement of the candidate workload using a disaggregation function. For instance, the zone level manager 120 may determine values for variables for the running of the workload on the computing nodes 131a-n at the zone level that minimize both a difference between a total cost of power consumption and an aggregated cost of power consumption received from the infrastructure level manager and a difference between a total QoS cost and an aggregated QoS cost received from the infrastructure level manager 120.

Some of the operations set forth in the method 300 may be contained as one or more utilities, programs, or subprograms, in any desired computer accessible or readable medium. In addition, the method 300 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 4:
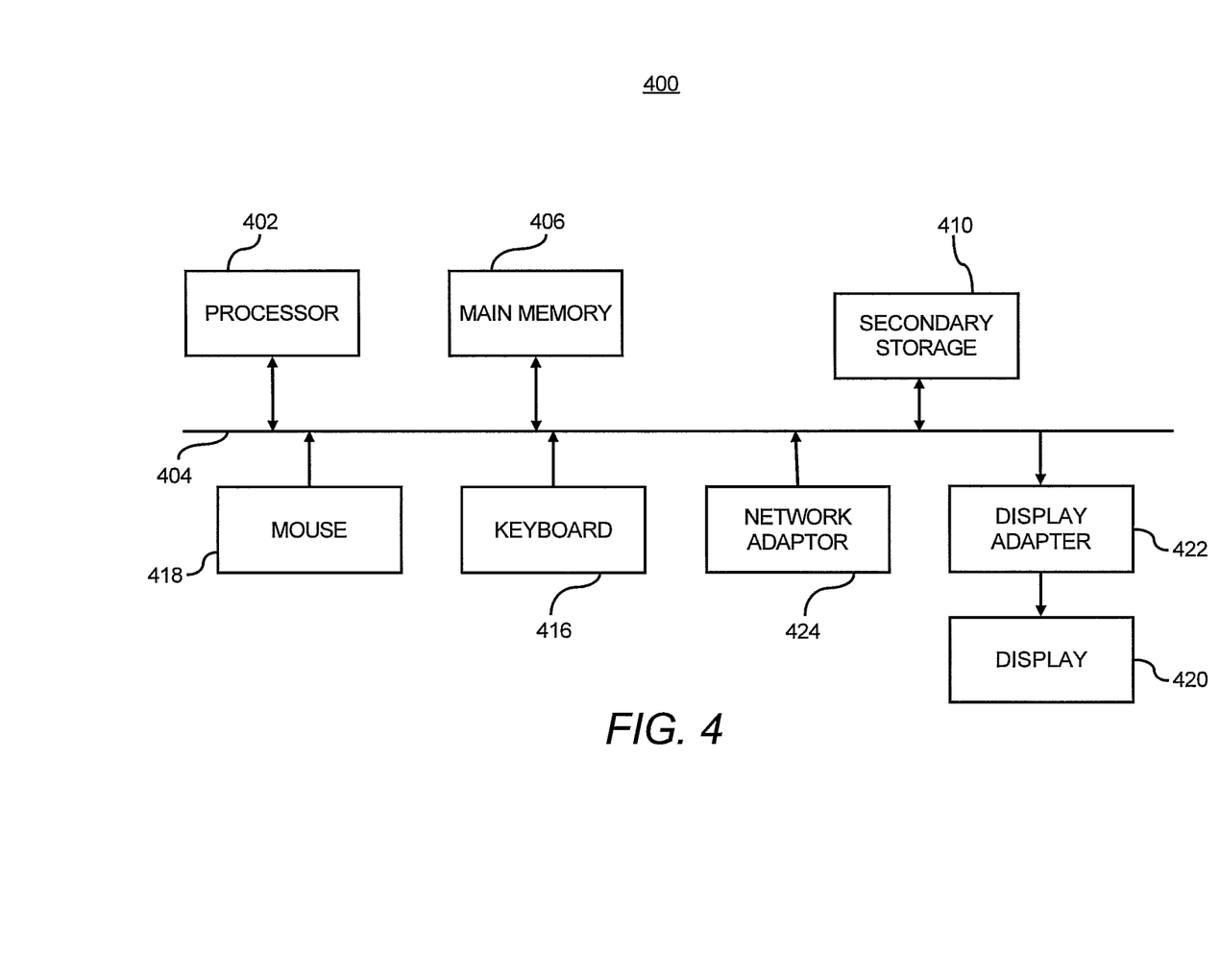
FIG. 4 illustrates a computer system, which may be employed to perform various functions of the system depicted in FIG. 1 in performing some or all of the steps contained in the diagrams depicted in FIG. 3, according to an embodiment of the invention.

FIG. 4 illustrates a computer system 400, which may be employed to perform the various functions of the system 100 described herein above, according to an example. In this respect, the computer system 400 may be used as a platform for executing one or more of the functions described hereinabove with respect to the management system 102.

The computer system 400 includes a processor 402, which may be used to execute some or all of the steps described in the methods herein. Commands and data from the processor 402 are communicated over a communication bus 404. The computer system 400 also includes a main memory 406, such as a random access memory (RAM), where the program code may be executed during runtime, and a secondary storage 410. The secondary storage may comprise, for example, a hard drive or other non volatile memory, where a copy of the program code for managing computing nodes and cooling devices cooling the computing nodes in an infrastructure may be stored.

The computer system 400 may comprise a server having a web interface. Alternately, the computing system 400 may be configured with user input and output devices including a keyboard 416, a mouse 418, and a display 420. A display adaptor 422 may interface with the communication bus 404 and the display 420 and may receive display data from the processor 402 and convert the display data into display commands for the display 420. In addition, the processor 402 may communicate over a network, for instance, the Internet, LAN, etc., through a network adaptor 424.

It will be apparent to one of ordinary skill in the art that other known electronic components may be added or substituted in the computer system 400. In addition, the computer system 400 may include a system board or blade used in a rack in a data center, a conventional "white box" server or computing device, etc. Also, one or more of the components in FIG. 4 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A system for managing computing nodes and cooling devices cooling the computing nodes in an infrastructure, the system comprising:
one or more managers configured to
receive a service request for a workload to be run on one or more of the computing nodes;
determine candidate workload placements for placing the workload on the one or more computing nodes;
determine a first cost associated with each candidate workload to placements using a computational network model, wherein the computational network model models power consumption of the one or more computing nodes and includes consideration of terms in a service level agreement (SLA);
determine a second cost associated with the cooling devices for each candidate workload placement using a thermal network model, wherein the thermal network model models power consumption of devices in the infrastructure, including the cooling devices;
minimize a cost function, wherein the cost function determines an economic cost of operating the infrastructure while running the requested workload and wherein the cost function is based upon the first cost, the second cost and an energy price; and
select a candidate workload placement from the candidate workload placements based on the minimized cost function.

2. The system according to claim 1, wherein at least one of the one or more managers is further configured to determine $u \in U(t, t+T)$ to minimize the cost function, wherein $U(t, t+T)$ is a set of admissible functions over an interval $[t, t+T]$ for controllable variables in the computational network model and the thermal network model, and the cost function is $$J(u, \xi, t_0, T) = \int_{t0}^{t0+T} c_P(T) \|p(t)\|_1 + \sum_{i=1}^{N} \sum_{j=1}^{J} c_q^j(q_i(t)) dt,$$

wherein $c_p(t)$ is an energy price at time t, p(t) is power consumed by the computing nodes and the cooling devices, $c_q$ is a cost vector for quality of service (QoS) and $c_q^j$ is its $j^{th}$ component, and $q_i(t)$ is a QoS at time t.

3. The system according to claim 2, wherein at least one of the one or more managers is further configured to minimize the cost function by determining for each computing node i $$q_i(t) = f_q(i, \lambda_i(t), I_i(t), p_i(t)),$$

wherein $q_i(t)$ is a vector of the QoS at time t at computing node i, $I_i(t)$ is a number of jobs already present at the computing node, $p_i(t)$ is power consumption at a time t, and $\lambda_i(t)$ is an arrival rate of jobs in class j at time t.

4. The system according to claim 1, wherein at least one of the one or more managers is further configured to use the computational network model to minimize the cost function by determining for each computing node i $$p_i(t) = f_{p,S}(i, \lambda_i(t), I_i(t), \rho_i(t)),$$

wherein pi(t) is power consumption of a computation at a time t, $f_{p,S}$ is a function based upon particular characteristics of the computing node, $I_i(t)$ is a vector with entries representing a number of jobs per job classes already present at the computing node, $\rho_i(t)$ is an amount of computational resources available at the computing node, and $\lambda_i(t)$ is an arrival rate of jobs at the computing node.

5. The system according to claim 1, wherein at least one of the one or more managers is further configured to use the thermal network model to determine for each cooling device $$p_i(t) = f_{p,C}(i, c_i(t), T_{ini}(t), T_{outi}(t)),$$

wherein $p_i(t)$ is power consumption at a time t and $f_{p,C}$ is a function based upon a coefficient of performance (COP) of the cooling device, and additional components that consume energy in the cooling device, $c_i(t)$ is a binary variable representing an on/off state of each cooling device, and $T_{ini}(t)$ and $T_{outi}(t)$ are input temperatures and output temperatures of the cooling device at time t.

6. The system according to claim 1, wherein the thermal network model used to determine the second cost associated with the cooling devices for each candidate workload placement further models power consumption of at least one environmental node, wherein the at least one environmental node comprises one or more devices in the infrastructure taking part in a heat exchange that cannot be used to perform computations or to control cooling of the infrastructure.

7. The system according to claim 1, wherein the one or more managers comprises:
an infrastructure level manager configured to manage the running of the workload on the computing nodes at an infrastructure level, wherein managing the running of the workload on the computing nodes at the infrastructure level comprises performing bulk management of workload and thermal management at the infrastructure level, using workload projections at predetermined intervals to schedule cooling and to select the candidate workload placements; and
one or more zone-level managers configured to manage the running of the workload on the computing nodes at a zone-level, wherein managing the running of the workload on the computing nodes at the zone-level includes allocation of workload and cooling in sub-areas within the selected candidate workload placements.

8. The system according to claim 7, wherein the infrastructure level manager is further configured to determine an aggregated cost of power consumption and an aggregated QoS cost for at least one of the one or more zone-level managers based on the minimized cost function.

9. The system according to claim 8, wherein the at least one zone-level manager is further configured to
determine values for variables for the running of the workload on the computing nodes at the zone-level that minimize both a difference between a total cost of power consumption and an aggregated cost of power consumption received from the infrastructure level manager and a difference between a total QoS cost and an aggregated QoS cost received from the infrastructure level manager.

10. The system according to claim 1, wherein the running of the workload on the computing nodes in the infrastructure is arranged in a hierarchy based on a timescale, wherein the time-scale at each level of the hierarchy is of a greater order than a next lower level of the hierarchy and a highest level of the hierarchy in the infrastructure level.

11. A method for managing computing nodes and cooling devices cooling the computing nodes in an infrastructure, the method comprising:

receiving a service request for a workload to be run on one or more of the computing nodes in the infrastructure;

determining candidate workload placements for placing the workload on the one or more computing nodes;

determining a first cost associated with each candidate workload placement using a computational network model, wherein the computational network model models power consumption of the one or more computing nodes and includes consideration of terms in an SLA;

determining a second cost associated with the cooling devices for each candidate workload placement using a thermal network model, wherein the thermal network model models power consumption of devices in the infrastructure, including the cooling devices;

minimizing a cost function, wherein the cost function determines an economic cost of operating the infrastructure while running the requested workload and wherein the cost function is based upon the first cost, the second cost and an energy price; and selecting a candidate workload placement from the candidate workload placements based on the minimized cost function.

12. The method according to claim 11, further comprising:
determining u∈U(t, t+T) to minimize the cost function, wherein U(t, t+T) is a set of admissible functions over an interval (t, t+T) for controllable variables in the computational network model and the thermal network model, and the cost function is $$J(u, \xi, t_0, T) = \int_{t0}^{t0+T} c_p(t) \|p(t)\|_1 + \sum_{i=1}^{N} c_q(q_i(t)) dt,$$

wherein $c_p(t)$ is an energy price at time t, p(t) is power consumed by the computing nodes and the cooling devices, $c_q$ is a cost vector for QoS, and $q_i(t)$ is a QoS at time t.

13. The method according to claim 12, further comprising:
minimizing the cost function by determining for each computing node i $$q_i(t) = f_q(i, \lambda_i(t), I_i(t), p_i(t)),$$

wherein $q_i(t)$ is a vector of the QoS at time t at computing node i, $I_i(t)$ is a vector with entries representing a number of jobs per job classes already present at the computing node, $p_i(t)$ is power consumption at a time t, and $\lambda_i(t)$ is an arrival rate of jobs in class j at time t.

14. The method according to claim 11, further comprising:
minimizing the cost function by using the computational network model to determine for each computing node i $$p_i(t) = f_{p,S}(i, \lambda_i(t), I_i(t), \rho_i(t)),$$

wherein $p_i(t)$ is power consumption of a computation at a time t, $f_{p,S}$ is a function based upon particular characteristics of the computing node, $I_i(t)$ is a vector with entries representing a number of jobs per job classes already present at the computing node, $\rho_i(t)$ is an amount of computational resources available at the computing node, and $\lambda_i(t)$ is an arrival rate of jobs at the computing node.

15. The method according to claim 11, further comprising:
using the thermal network model to determine for each cooling device $$p_i(t) = f_{p,C}(i, c_i(t), T_{ini}(t), T_{outi}(t)),$$

wherein $p_i(t)$ is power consumption at a time t and $f_{p,C}$ is a function based upon a COP of the cooling device, and additional components that consume energy in the cooling device, $c_i(t)$ is a binary variable representing an on/off state of each cooling device, and $T_{ini}(t)$ and $T_{outi}(t)$ are input temperatures and output temperatures of the cooling device at time t.

16. The method according to claim 11, further comprising:
determining the second cost associated with the cooling devices for each candidate workload placement using the thermal network model, wherein the thermal network model models power consumption of at least one environmental node, wherein the at least one environmental node comprises one or more devices in the infrastructure taking part in a heat exchange that cannot be used to perform computations or to control cooling of the infrastructure.

17. The method according to claim 11, further comprising:
managing the running of the workload on the computing nodes at an infrastructure level using an infrastructure level manager, wherein managing the running of the workload on the computing nodes at the infrastructure level comprises performing bulk management of workload and thermal management at the infrastructure level, using workload projections at predetermined intervals to schedule cooling and to select the candidate workload placements; and managing the running of the workload on the computing nodes at a zone-level using one or more zone-level managers, wherein managing the running of the workload on the computing nodes at the zone-level includes allocation of workload and cooling in sub-areas within the selected candidate workload placements.

18. The method according to claim 17, further comprising:
determining an aggregated cost of power consumption and an aggregated QoS cost for at least one of the one or more zone-level managers based on the minimized cost function.

19. The method according to claim 18, further comprising:
determining values for variables for the running of the workload on the computing nodes at the zone-level that minimize both a difference between a total cost of power consumption and an aggregated cost of power consumption received from the infrastructure level manager and a difference between a total QoS cost and an aggregated QoS cost received from the infrastructure level manager.

20. A computer readable storage medium on which is embedded one or more computer programs, said one or more computer programs implementing a method for managing computing nodes and cooling devices cooling the computing nodes in an infrastructure, said one or more computer programs comprising computer readable code for:

receiving a service request for a workload to be run on one or more of the computing nodes in the infrastructure;

determining candidate workload placements for placing the workload on the one or more computing nodes;

determining a first cost associated with each candidate workload placement using a computational network model, wherein the computational network model models power consumption of the one or more computing nodes and includes consideration of terms in an SLA;

determining a second cost associated with the cooling devices for each candidate workload placement using a thermal network model, wherein the thermal network model models power consumption of devices in the infrastructure, including the cooling devices;

minimizing a cost function, wherein the cost function determines an economic cost of operating the infrastructure while running the requested workload and wherein the cost function is based upon the first cost, the second cost and an energy price; and selecting a candidate workload placement from the candidate workload placements based on the minimized cost function.

\* \* \* \* \*

UNITED STATES PATENT AND TRADEMARK OFFICE
CERTIFICATE OF CORRECTION

PATENT NO. : 8,539,059 B2  
APPLICATION NO. : 12/792400  
DATED : September 17, 2013  
INVENTOR(S) : Luca Parolini et al.

Page 1 of 1

It is certified that error appears in the above-identified patent and that said Letters Patent is hereby corrected as shown below:

In the Claims:

In column 9, line 19, in Claim 1, delete "workload to" and insert -- workload --, therefor.

In column 9, line 40, in Claim 2, delete "[t, t+T)" and insert -- (t, t+T) --, therefor.

Signed and Sealed this  
Third Day of June, 2014

Michelle K. Lee  
*Deputy Director of the United States Patent and Trademark Office*